United States Patent [19]

Tani et al.

[11] Patent Number: 4,517,853

[45] Date of Patent: May 21, 1985

[54] BALANCING DEVICE

[75] Inventors: Shigetaka Tani; Toshio Nagahara, both of Toyama, Japan

[73] Assignee: Toyama Machine Works, Limited, Toyama, Japan

[21] Appl. No.: 348,613

[22] Filed: Feb. 12, 1982

[30] Foreign Application Priority Data

Feb. 16, 1981 [JP] Japan .................................. 56-21232

[51] Int. Cl.³ ........................ F16H 27/02; F16H 29/02
[52] U.S. Cl. ................................ 74/89.15; 414/750; 414/749
[58] Field of Search .................... 74/89.15, 424.8 NA, 74/216.3; 310/42, 66; 414/749, 750

[56]  References Cited

U.S. PATENT DOCUMENTS

| 2,219,844 | 10/1940 | Lotter et al. | 74/89.15 |
| 2,504,408 | 4/1950 | Griffin | 74/89.15 |
| 2,509,185 | 5/1950 | Eckel | 310/66 |
| 2,820,162 | 1/1958 | Snell | 74/89.15 |
| 2,898,281 | 8/1959 | Untermyer | 74/89.15 |
| 2,983,159 | 5/1961 | Zeligowsky et al. | 74/89.15 |
| 3,597,835 | 8/1971 | Uccle et al. | 310/42 |
| 3,864,822 | 2/1975 | Eash et al. | 310/42 |
| 4,073,386 | 2/1978 | De Nomme | 414/749 |
| 4,128,019 | 12/1978 | Kupka | 74/89.15 |
| 4,290,291 | 9/1981 | Burns | 310/42 |

FOREIGN PATENT DOCUMENTS

| 1477729 | 5/1969 | Fed. Rep. of Germany | 74/89.15 |
| 2555150 | 6/1976 | Fed. Rep. of Germany | 414/749 |
| 1328431 | 4/1963 | France | 310/42 |
| 2258035 | 1/1974 | France | 310/42 |
| 1484466 | 9/1977 | United Kingdom | 310/42 |
| 2060445 | 5/1981 | United Kingdom | 74/89.15 |

Primary Examiner—George H. Krizmanich
Assistant Examiner—Dirk Wright
Attorney, Agent, or Firm—Sughrue, Mion, Zinn, Macpeak & Seas

[57] ABSTRACT

A balancing device which may be used in an industrial robot includes a feed screw for moving a robot arm in one direction. The arm and its associated mechanisms impart a torque to the screw which is a load on the drive motor. A balancing feed screw is connected to the main screw and, under the influence of a controlled pressure fluid driven piston, serves to balance the load.

14 Claims, 5 Drawing Figures

BALANCING DEVICE

BACKGROUND OF THE INVENTION

This invention relates to means for reducing the power which is required to drive the movable parts of an industrial robot or the like, and more particularly to a balancing device for balancing the force of action between the driven part and the driving part.

For instance, in an industrial robot using cylindrical coordinates, the means for lifting the robot hand is made up of a vertical feed screw and an electric motor for driving the feed screw. In this case, the weight of the robot hand, the light weight of the movable frame which supports the robot hand, the weight of an object gripped by the robot hand, and external forces produced during acceleration of deceleration are exerted on the feed screw. Accordingly, the capacity of the drive motor should be large enough to deal with the combination of the above-described forces. Therefore, although only a small amount of power is required to lift the object, the motor capacity must be large. This represents a loss in the drive system.

In order to avoid this drawback, in the prior art, the rod of an air cylinder is used to provide an upwardly directed force on the movable frame, so that the light weight of the movable frame, etc. are cancelled by the upwardly directed force, whereby the motor load is reduced. However, such an air cylinder must be considerably long. If such an air cylinder is employed, the resultant device is unavoidably large in size. Therefore, the application of such a device to an industrial robot is rather difficult.

SUMMARY OF THE INVENTION

Accordingly, an object of this invention is to provide a balancing device which uses a small cylinder and which can be incorporated inside an industrial robot.

In order to achieve the foregoing object, the invention focusses on the torque which is induced in a ball screw by the weight of the movable frame or the weight of an object gripped by the robot hand. This torque is cancelled by the operation of a balancing cylinder, i.e., by the torque of a balancing ball screw which is driven by the balancing cylinder.

DETAILED DESCRIPTION OF THE PREFERRED EMBODIMENTS

One embodiment of this invention will be described with reference to an industrial robot.

Figure 1:
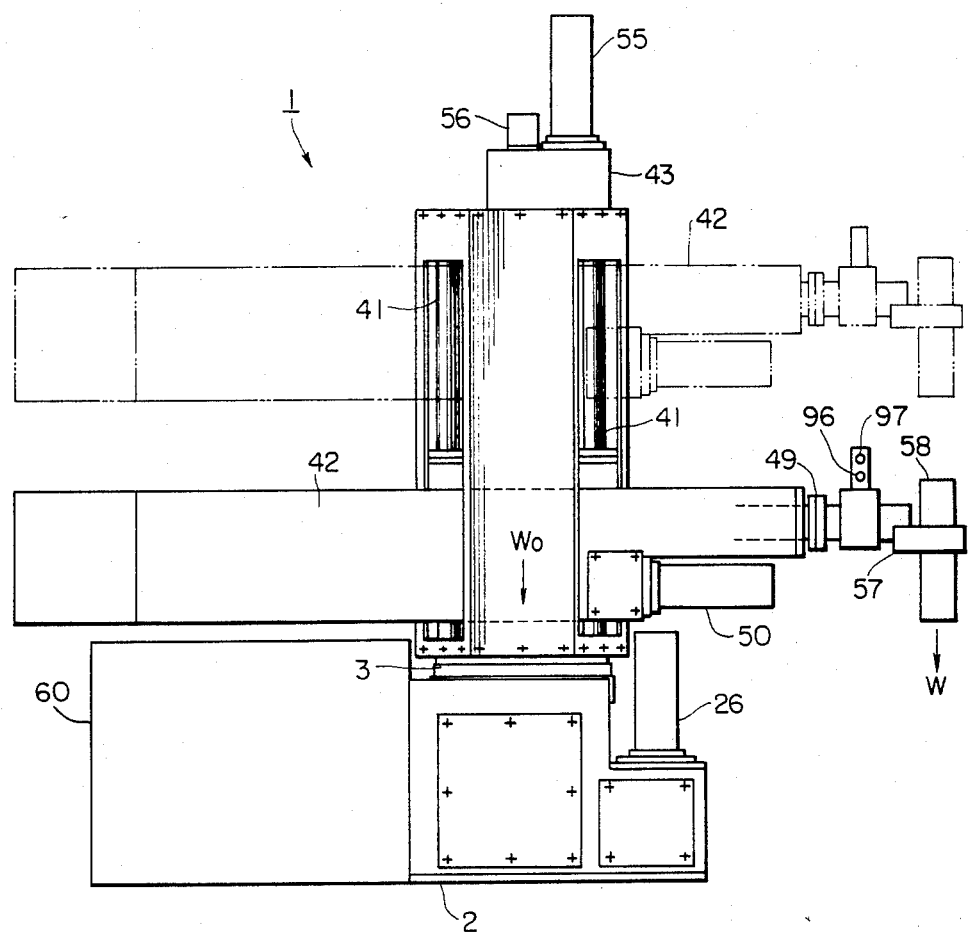
FIG. 1 is a front view of an industrial robot.
Figure 2:
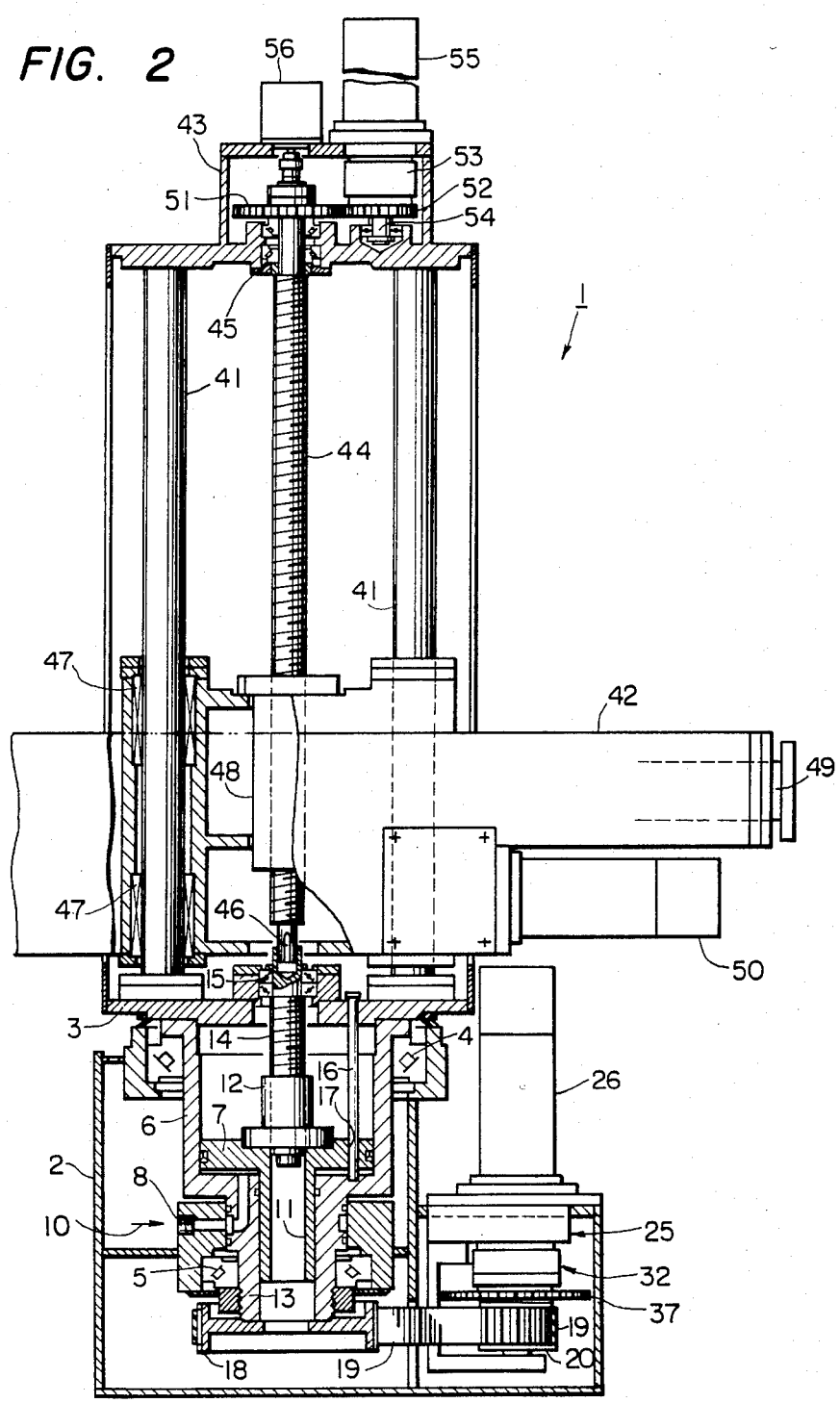
FIG. 2 is a sectional view showing the essential components of the industrial robot of FIG. 1.

FIGS. 1 and 2 show an industrial robot 1 using cylindrical coordinates. The industrial robot 1 has the necessary drive mechanisms in a foundation 2 installed on the ground or the like. The foundation 2 is box-shaped, and has upper and lower bearings 4 and 5 therein. A swivel table 3 is provided above the foundation 2 and is supported by the upper and lower bearings 4 and 5 in such a manner that it is rotatable in a horizontal plane. The swivel 3 itself forms a vertical balancing cylinder 6. The cylinder 6 has the purpose of producing a balancing force, and is provided with a piston 7 inside. The cylinder 6 has upper and lower chambers which are divided by the piston 7. The cylinder 6 receives, through a port 8 in the lower chamber, a fluid 10 such as oil or air which is pressurized to a predetermined value by a pressure control unit 9 (described hereafter). The piston 7 has a hollow piston rod 11 extended downwardly, and a ball nut 12 on its upper surface. The piston rod 11 is guided in a guide hole 13 formed in the lower portion of the cylinder 6 while being held liquid-tight therein. The ball nut 12 is threadably engaged with a balancing ball screw 14 which serves as a balancing feed screw. The linear "advance" or "lead" of the balancing ball screw 14 per one rotation is on the order of 10 mm, e.g. the ball nut mounted on the screw would advance linearly 10 mm for each rotation of the screw. The balancing ball screw 14 is rotatably supported by a bearing 15 at the upper portion thereof. During operation, torque is applied to the piston 7. In order to prevent the piston from being turned by the torque, a turn preventing shaft 16 is provided inside the cylinder 6. More specifically the shaft 16 is secured to the cylinder 6 and is extended through a guide hole 17 in the piston 7 so that the piston 7 is movable vertically only. A timing pulley 18 is secured to the lower end of the cylinder 6, and a timing belt 19 is laid over this pulley and a timing pulley 20.

Figure 3:
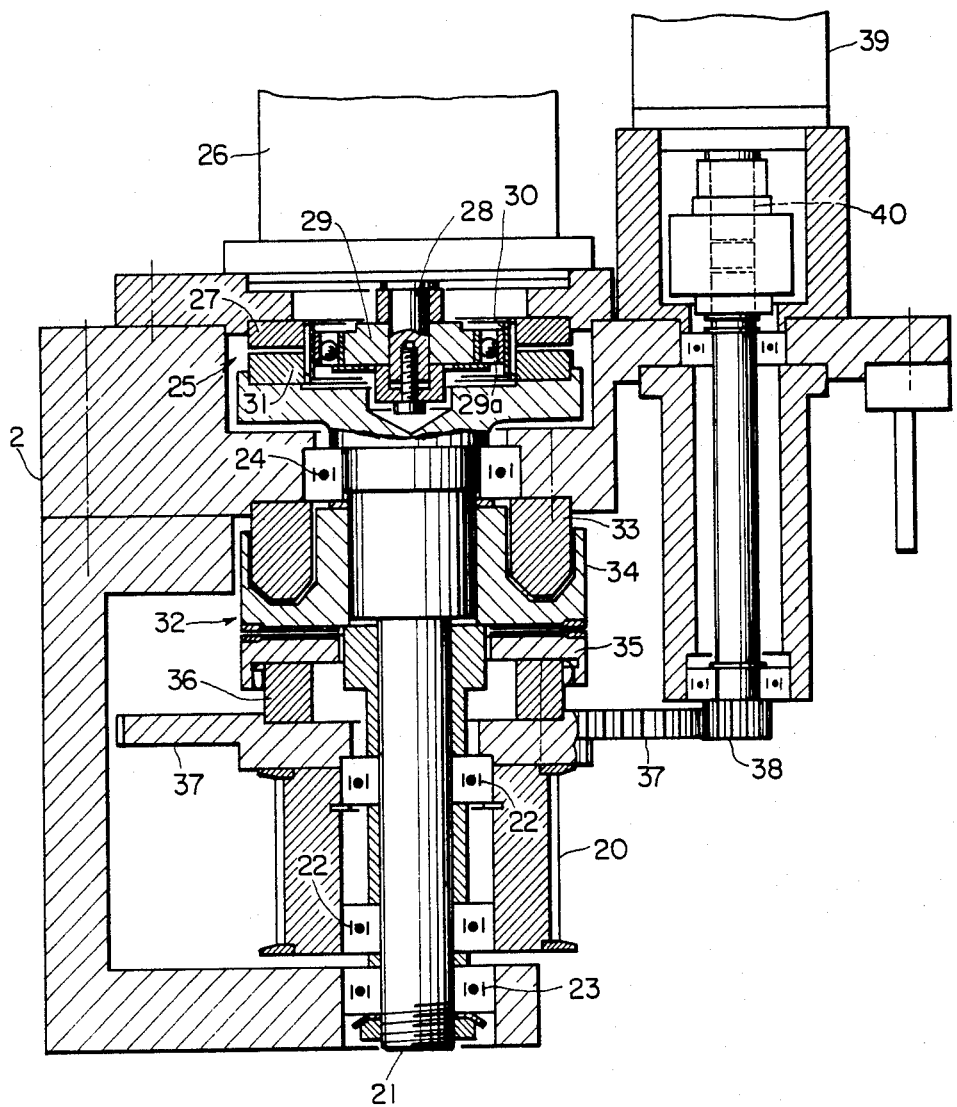
FIG. 3 is a sectional view showing a swivel table drive mechanism in the industrial robot.

The timing pulley 20 is rotatably supported by a bearing 22 which is mounted on a shaft 21, as shown in FIG. 3. The shaft 21 is itself supported by upper and lower bearings 23 and 24 mounted on a side of the foundation 2, and the upper end portion of the shaft 21 is coupled to a swivel drive motor 26 through a harmonic drive type reduction gear unit 25. A motor shaft 28 is coupled to the wave generator 29 of the reduction gear unit 25. A wave generator bearing 29a is mounted on the wave generator 29 to hold a flexspline 30. The flexspline 30 is engaged with a stationary circular spline 27 and an output circular spline 31 which is secured to the upper end of the shaft 21. A clutch 32 is provided between the shaft 21 and the timing pulley 20. The clutch 32 is, for instance, of the electromagnetic type. The clutch 32 has an exciting coil 33 which is secured to a part of the foundation 2 in such a manner that it surrounds the shaft 21 and extends downwardly. A stationary clutch member 34 is mounted on the shaft 21 in such a manner as to cover the exciting coil 33. A movable clutch member 35, which is attracted by the stationary clutch member 34 and the exciting coil 33, is slidably supported on the shaft 21. When the exciting coil is energized, the movable clutch member 35 is engaged with a drive adapter 36 through teeth, so that the rotation of the motor is transmitted to a gear 37 secured to the drive adapter 36 and to the aforementioned timing pulley 20. The gear 37 is engaged with a gear 38 to drive the input shaft 40 of a pulse encoder 39. The pulse encoder 39 operates to produce a pulse signal in proportion to the rotation of the motor 26, i.e., the amount of rotation of the swivel table 3. The pulse signal is used as a rotation positioning control signal.

Referring back to FIGS. 1 and 2, two guide bars 41 are set upright on the upper surface of the swivel table 2. The guide bars 41 serve to guide a movable frame 42 in such a manner that the frame 42 is moved up and down along the guide bars 41. A gear box 43 is secured to the upper ends of the guide bars 41. The gear box 43 has a bearing 45 which supports a ball screw 44, which is a lifting feed screw extended between the two guide bars 41 and in parallel therewith, in such a manner that the ball screw 44 is rotatable. The linear advance of the ball screw 44 per one rotation is on the order of 50 mm for instance. The ball screw 44 has a spline 46 at the lower end thereof by which it is connected directly and coaxially to the above-described balancing ball screw 14. The movable frame 42 is guided along the guide bars 41 with the aid of upper and lower slide bearings 47. The movable frame 42 is connected to the ball screw 44 through a ball nut 48. The movable frame 42 is provided with a robot arm 49 which is movable horizontally. With a robot hand 57 (FIG. 1) connected to the end of the robot arm 49, the latter is driven by a drive motor 50.

The above-described gear box 43 incorporates inter-engaged speed reducing gears 51 and 52. The gear 51 is secured to the upper end portion of the ball screw 44, and the gear 52 is fixedly secured to the output shaft 54 of a clutch 53. The clutch 53 is, for instance, an electromagnetic clutch. The input side of the clutch 53 is coupled to a lifting motor 55; that is, the clutch 53 is driven by the motor 55. The motor 55 and a pulse encoder 56 are set on the gear casing 43, the pulse encoder 56 being coupled to the ball screw 44. The pulse encoder 56 provides a pulse signal proportional to the amount of rotation of the ball screw 44, i.e., the amount of vertical movement of the movable frame 42. The pulse signal is used as a vertical positioning control signal. A control box 60 incorporates a pressure control unit 9 and an electrical control unit 80 (described hereafter) and is provided on the side of the foundation 2. The drive motor 55, the ball screw 44 serving as the feed screw, and the balancing ball screw 14 serving as a balancing feed screw together form the balancing device according to the invention.

Figure 4:
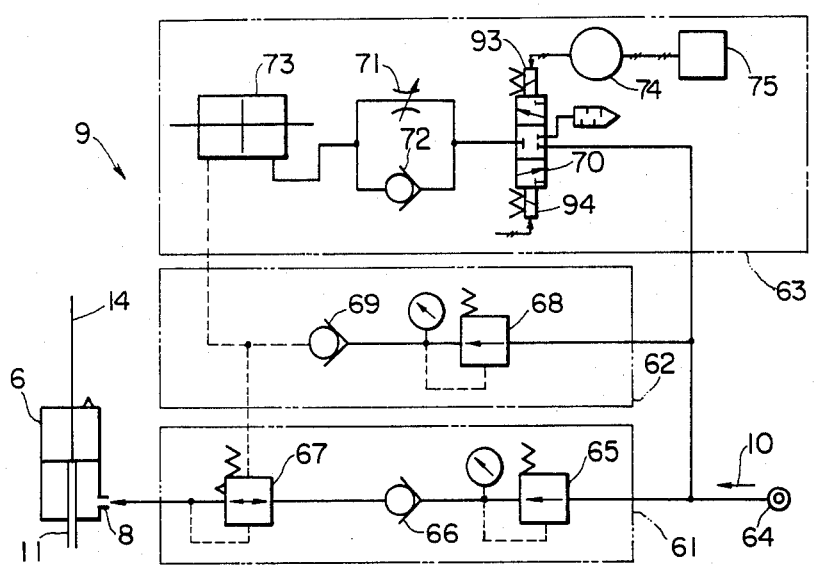
FIG. 4 is a diagram of various elements in a pressure control unit.

FIG. 4 shows one example of a pressure control unit 9 for the cylinder 6. The pressure control unit 9 is composed of a main circuit 61, a light weight balancing control circuit 62, and a load balancing control circuit 63. The main circuit 61 operates to adjust the pressure of the pressurized fluid 10 for driving the cylinder 6. The pressurized fluid from a pressurized fluid source 64 is introduced to the port 8 of the cylinder 6 through a pressure reducing valve 65 for setting the pressure, a check valve 66 for preventing natual pressure drop, and a pressure control valve 67 with a pilot valve. The control circuit 62 operates to set a pressure corresponding to the light weight of the movable frame 42. The control circuit 62 has a pressure reducing valve 68 for pressure adjustment and a check valve 69 connected between the source 64 and the pilot pressure input port of the pressure control valve 67. The control circuit 63 operates to adjust the pressure in response to a load or other variable external forces which are applied to the robot arm 49. The control circuit 63 has a series circuit of an electromagnetic three-position three-direction switching valve 70, a flow rate adjusting valve 71 and a check valve 72 which are connected in parallel with each other, and a pressure converter 73. The series circuit is connected between the pressurized fluid source 64 and the pilot pressure connecting port of the pressure control valve 67. The operation of the switching valve 70 is controlled by the on-off operation of a relay 74, which is driven by the output of a load detector 75. The load detector 75 operates to detect a load or other external forces applied to the robot arm 49. In this embodiment, the load detector is made up of a detecting resistor 76 (described hereafter) to which a stall current generated in the lifting motor 55 is applied; however, it may be composed of a load cell or the like.

Figure 5:
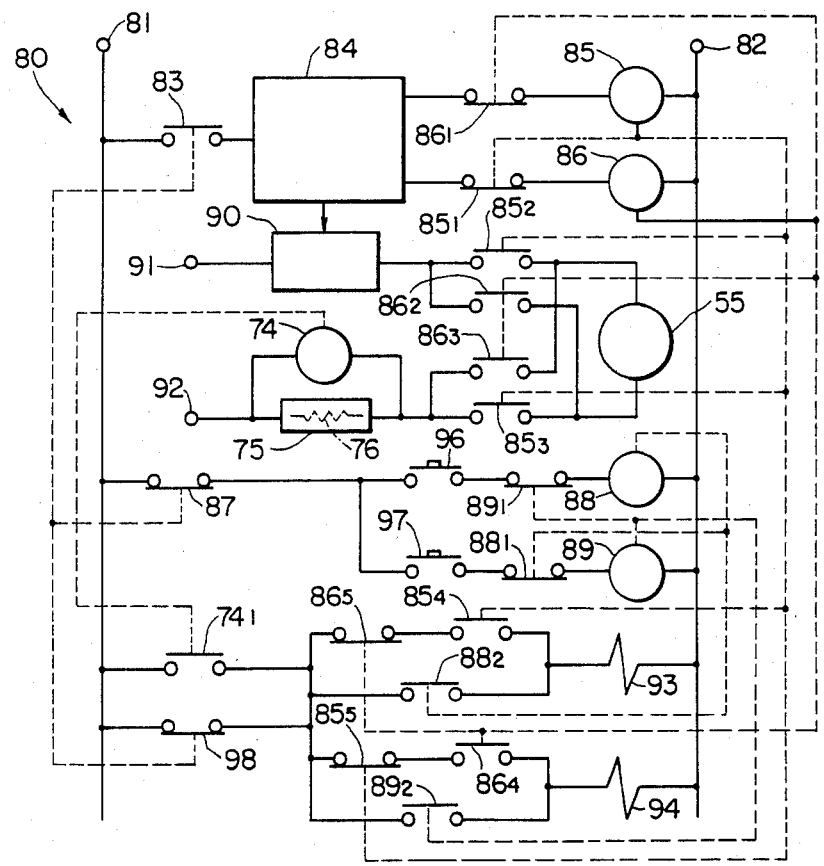
FIG. 5 is a circuit diagram showing an electrical control unit.

FIG. 5 illustrates the electrical control unit 80. The electrical control unit 80 operates to control the forward and reverse rotation of the motor 55, to detect the stall current and to control the on-off operation of the switching valve 70. In the control unit 80, contact means 83 which is closed in an automatic balance operation, a main control device 84, a relay contact means $86_1$ of a relay 86 for reverse motor rotation (upward movement) instruction, a relay 85 for forward motor rotation (downward movement) instruction, a contact means $85_1$ of the relay 85 and the aforementioned relay 86 are connected between two control power source terminals 81 and 82. A series circuit of a current control circuit 90, a relay contact means $85_2$ of the relay 85, the motor 55, a relay contact means $85_3$ of the relay 85 and the detecting resistor 76 is connected between two DC source terminals 91 and 92 through which the motor 55 is driven. Relay contact means $86_2$ and $86_3$ for changing the polarity of the motor 55 are combined with the contact means $85_2$ and $85_3$. The aforementioned relay 74 is connected in parallel with the detecting resistor 76. A manual pressure increasing relay 88, a manual pressure reducing relay 89, and the electromagnetic coils 93 and 94 of the switching valve 70 are connected between the control power source terminals 81 and 82.

The relay 88, a contact means 87, a pressure increasing switch 96 and a relay contact means $89_1$ are connected in series between the control power source terminals 81 and 82. The relay 89, a pressure reducing switch 97 and a relay contact means $88_1$ are connected in series between the control power source terminal 82 and the connecting point of the contact means 87. A series circuit of the electromagnetic coil 93, a relay contact means $88_2$ and a contact means 98 is connected between the control power source terminals 81 and 82. A series circuit of the electromagnetic coil 94 and a relay contact means $89_2$ is connected between the control power source terminal 82 and the connecting point of the contact means $88_2$ and 98. A relay contact means $74_1$ is connected in parallel to the contact means 98. A series circuit of relay contact means $86_5$ and $85_4$ is connected in parallel with the relay contact means $88_2$. A series circuit of relay contact means $85_5$ and $86_4$ is connected in parallel to the relay contact means $89_2$. In FIG. 5, components operated simultaneously are connected by broken lines.

The industrial robot 1 is operated as follows:

In order to move the robot arm 49 back and forth, first the drive motor 50 is started. The robot arm 49 moves in and out of the movable frame 42 depending on the direction of rotation of the drive motor 50.

In order to swivel the swivel table 3, the motor 26 is started. The rotation of the motor shaft 28 is transmitted to the shaft 21 through the reduction gear unit 25. When, under this condition, the exciting coil 33 of the clutch 32 is energized, the movable clutch member 35 is attracted by the stationary clutch member 34; that is, the former becomes engaged with the latter. As a result, the rotation of the shaft 21 is transmitted to the gear 37 and the timing pulley 20, and the rotation of the timing pulley 20 is transmitted through the timing belt 19 to the timing pulley 18. Therefore, the swivel table 3 is swivelled relative to the foundation 2 while supporting the movable frame 42. The swivel angle, in this case, can be limited by providing a limit switch (not shown) on the foundation 2 in such a manner that the limit switch is operated by a dog (not shown) provided on the swivel table 3.

In order to move the movable frame 42 up and down, the motor 55 is started. The direction of rotation of the motor 55 is determined by the main control device 84 when the contact means 83 is closed. The control device 84 not only executes a predetermined program, but also controls the current control circuit 90 so that suitable drive currents are provided for start, stop and speed control (acceleration and deceleration) operations. Upon energization of the relay 85, its contact means $85_2$ and $85_3$ are closed, and therefore the motor 55 rotates in the forward direction. On the other hand, when the relay 86 is energized, its contact means $86_2$ and $86_3$ are closed to drive the motor 55 in the reverse direction. The rotation of the motor 55 is transmitted to the clutch 53 and the gears 51 and 52 to drive the ball screw 44 which serves as a feed screw for moving the frame 42 up and down. When the motor 55 rotates in the forward direction, the ball screw 44 drives the ball nut 48 to move the movable frame 42 upwardly. When the motor 55 rotates in the reverse direction, the ball screw 44 moves the movable frame 42 downwardly. When the movable frame 42 is moved upwardly, the pair of guide bars 41 prevents the movable frame 42 from being turned by the ball screw 44. By the combination of the above-described horizontal motion, swivel motion and vertical motion, the robot hand 57 can move, as desired, between predetermined positions.

The relatively light weight (Wo) of the movable frame 42 acts on the ball screw 44, so that torque is induced in the ball screw at all times. Therefore, a load due to the torque attributable to the weight (Wo) is applied to the motor 55 at all times, and, accordingly, even when the motor is stopped. Therefore, the cylinder 6 receives pressurized fluid 10, to apply torque to the balancing ball screw 14 which cancels out the torque on the ball screw 44 attributable to the weight (Wo). More specifically, the pressurized fluid 10 introduced into the cylinder 6 imparts a predetermined pressure on the piston 7 so that an upwardly directed force is exerted on the ball nut 12. Therefore, the balancing ball screw 14 cancels the torque of the ball screw 44 through the spline 46. The liquid pressure in the cylinder 6 for this purpose is obtained by adjusting the pressure reducing valve 68. The pressure control valve 67 in the main circuit 61 is a diaphragm type control valve high in accuracy and speed. The pressure control valve 67 compares a specified pilot pressure, which is set by the pressure reducing valve 68, with the internal pressure of the cylinder 6, so that, depending on the comparison result, the pressurized fluid 10 is supplied to or returned from the cylinder 6 through the main circuit 61, whereby the internal pressure in the cylinder 6 is maintained equal to the specified pilot pressure. When the pressure of the pressurized fluid source 64 is reduced for some reason, the check valves 66 and 69 operate to stop the reverse flow to thereby stop the abnormal downward movement of the movable frame 42. A pressure detecting switch (not shown) is provided for the pressurized fluid source 64, as another security control means for the robot. More specifically, the pressure detecting switch detects when the pressure is abnormally reduced, so that the operation of the robot is automatically stopped.

As was described before, the lead of the balancing ball screw 14 is about one-fifth (1/5) of that of the ball screw 44. Therefore, the length of the balancing ball screw 14 is one-fifth of that of the ball screw 44. However, it should be noted that the torque cancelling operation is effected throughout the stroke—between the upper and lower limits—of the movable frame 42. This is effective in reducing the length of the cylinder 6 and in reducing the size of the device. The balancing ball screw 14 and the ball screw 44 are arranged coaxially as described before. Therefore, the balancing ball screw 14 can preferably be connected directly to the ball screw 44. However, the ball screws 14 and 44 may be coupled through a pair of spur gears in such a manner that they are parallel with each other. Alternately, the balls screw 14 and 44 may be coupled through a pair of bevel gears in such a manner that they are perpendicular to each other. If, in this case, the number of teeth of the gear of the balancing ball screw 14 is larger than the number of teeth of the gear of the ball screw 44 which is engaged with the former gear, then the length of the balancing ball screw 14 can be made smaller than that of the ball screw 44 even if the leads of the screws 14 and 44 are equal.

When the robot hand 57 holds and carries an object 58, the weight (W) of the object 58 is applied, as a load, to the motor 55. In this case, different objects provide different loads, and furthermore the load is changed as the object is moved upwardly or downwardly and as the acceleration is varied, during the operation. Accordingly, the pilot pressure of the pressure control valve 67 must be automatically adjusted according to the variation of the load. The load compensating operation is carried out by the control circuit 63 and the electrical control circuit 80.

The series of automatic load compensating operations are as follows: The main control device 84 detects when the robot hand 57 grips an object 58 at a predetermined position, and energizes the relay 85 to turn the motor 55 in the forward direction, in order to move the movable frame 42 upwardly. In this operation, the input current to the motor 55 is set according to the acceleration and the upward movement speed by the current control circuit 90 at all times. Since self adjustment is effected in the DC motor 55, the latter varies the input current in response to an increase or decrease of load torque of the ball screw 44. When the input current exceeds a certain value, a predetermined voltage is developed across the detecting resistor 76 in the load detector 75. The relay 74 is driven by the voltage to close its contact means $74_1$. As a result, since the relay contact means $85_4$ is closed, the pressure increasing electromagnetic coil 93 drives the switching valve 70, so that the pressurized fluid 10 is applied through the check valve 72 and the pressure converter 73 to the pilot pressure input terminal of the pressure control valve 67. Thus, the pressure in the cylinder 6 is automatically increased to a value corresponding to the load torque of the ball screw 44. This compensating operation can respond accurately to the variation of load torque which is due to the upward movement, acceleration variation and stoppage of the movable frame 42 as well as the weight (W) of the object 58, because the operating conditions of the movable frame 42 directly affect the input current. Therefore, the DC motor 55 is an essential element forming a part of the detecting means. The load detector may be so designed as to detect a thrust load to the ball screw 44; and therefore it may be composed of load detecting means such as a load cell.

When the movable frame 42 approaches the stop position after being sufficiently accelerated, the main control device 84 operates to brake the motor 55 to decelerate the movable frame 42. Also in the case when the movable frame 42 is moved downwardly the detecting resistor 76 detects the current of the motor 55, and when the current exceeds a predetermined value, the relay 74 closes its contact means $74_1$. In this case, the motor 55 is rotated in the reverse direction, and therefore the relay contact means $86_4$ is closed. Accordingly, the electromagnetic coil 94 drives the switching valve 70, so that the pilot pressure setting pressurized fluid 10 of the pressure converter 73 is returned from the flow rate adjusting valve 71 and is discharged through the outlet of the switch valve 70, to adjust the pilot pressure. At the same time, the pressure control valve 67 causes the pressurized fluid 10 in the cylinder 6 to flow out in order to decrease the pressure in the cylinder 6.

The pressure converter 73 is provided in order that impulsive pressure variations are not applied to the pilot pressure input terminal of the pressure control valve 67 and so that the pilot pressure of the pressure control valve 67 is not reduced to less than the light weight compensation pressure. When the switching valve 70 is opened to the atmosphere in order to reduce the pilot pressure, the piston in the pressure converter 73 is pushed to the input port side by the pilot pressure, and thereafter the piston is not moved further. Accordingly, the pilot pressure of the pressure control valve 67 is not reduced below the light weight compensation pressure.

The industrial robot 1 is so constructed that it operates as a playback type according to a direct teaching system, so that it can be used for many purposes. Therefore, if the operator teaches the robot reference operations, the robot then stores the reference operations with the aid of a memory device provided separately, and carries out the operations repeatedly. In teaching such operations, after the movable frame 42 is manually moved in a vertical direction, the robot arm 49 is stretched to a required position so that its position, or the stop position, may be stored, and thereafter the swivel table 3 is turned through a required swivel angle so that its position may be stored. In this case, it is necessary that all the movable parts be readily movable. For this purpose, the lead of the ball screw 44 is made as coarse as possible. However, the reduction gear unit 25 and the speed reducing gears 51 and 52 in the drive system oppose the manual drive, and the frictional force thereof obstructs the manual drive. Accordingly, a considerably large force is required to reversely drive these components. In order to eliminate this difficulty, in the teaching operation, the clutches 32 and 53 are operated to disconnect the drive system to thereby release the load during teaching. More specifically, in the clutch 32, the movable clutch part 35 is disengaged from the stationary clutch member 34 by deenergizing the exciting coil 33, so that the shaft 21 is disconnected from the timing purley 20, and the swivel table 3 can be turned readily. On the other hand, the motor 55 which otherwise is a load applied to the ball screw 44 during teaching, is disconnected by the clutch 53, as a result of which the ball screw 44 can be turned readily. According to the above-described method, the movable frame 42 and the swivel table 3 are made to be manually movable with ease; that is, the movable frame 42 becomes easily manually movable in a vertical direction and the swivel table 3 becomes easily manually turnable. The balancing ball screw 14 and the ball screw 44 are essential in the sense of reducing slide friction; however, they may be replaced by feed screws.

During teaching, the light weight (Wo) of the movable frame 42 and the weight (W) of the object 58 gripped by the robot hand 57 becomes a load which is applied to the operator. Therefore, the operator may need a large operating force to teach the robot. The light weight (Wo) of the movable frame 42 is compensated by the operation of the control circuit 62 at all times, as was described before. However, the weight (W) of the object 58 gripped by the robot hand 57 is not compensated, as the motor 55 forming a part of the detecting means is disabled. Therefore, the following method is employed in which the weight (W) is compensated by a manual pressure increase or decrease. When the robot hand 57 grips an object 58, the operator turns on the pressuring increasing switch 96. In the teaching operation the contact means 87 is maintained closed, and the relay contact means $89_1$ is not actuated, i.e., it is also maintained closed. Therefore, the relay 88 is energized to close its contact means $88_2$. As a result, the electromagnetic coil 93 is energized through the closed contact means 98 and $88_2$, to drive the switching valve 70 to increase the pressure. The operator determines when the robot arm 49 may be manually moved upwardly with ease, and turns off the pressure increasing switch 96. As a result, the switching valve 70 is set to the middle position, and from this instant the pressure in the cylinder 6 is maintained increased. Accordingly, the robot hand 57, gripping the object 58, remains in balance with the light weight (Wo) of the movable frame 42 and the weight (W) of the object 58. Under this condition, the operator moves the robot hand 57 upwardly, swivels it horizontally, and moves it downwardly to set the object at a desired position. When the robot hand 57 releases the object 58, the compensation state of the robot hand 57 must be returned to the light weight compensation state. Therefore, before the robot hand 57 releases the object 58, the operator turns on the pressure decreasing switch 97. As a result, the relay 89 causes the switching valve 70 to carry out the pressure reducing operation, to thereby reduce the pilot pressure of the pressure control valve 67 to the light weight compensation value.

The reason why the above-described manual operation must be carried out is that the detecting terminal of the control circuit 63 is the motor 55, which operates only in the non-teaching operation. However, if the aforementioned load cell is employed as the detecting means of the control circuit 63 to directly detect the thrust load of the ball screw 44, then the weight of the object 58 can be automatically compensated.

In the above-described embodiment, the balancing device of the invention is applied to an industrial robot; however, it can be applied to counterbalance other industrial mahcines.

As is apparent from the above description, in the balancing device of the invention, the feed screw for driving the movable frame is coupled to the balancing feed screw, torque is generated in the balancing feed screw by the cylinder, and the torque thus generated is utilized to cancel the torque which is generated in the feed screw and which is a load applied to the motor. That is, according to the invention, the torque of the feed screw is cancelled by the torque of the balancing feed screw. Accordingly, the motor capacity may be smaller, and the power for driving the movable frame can be efficiently used. Furthermore, as the movable frame is supported in balance with the acting force, even when the power source malfunctions or the drive system is disconnected, the movable frame will never move down abruptly. For the same reason, the movable frame can be readily moved during the teaching operation. As the balancing feed screw is coaxial with the driving feed screw, a part of the balancing mechanism can be miniaturized so that it may be incorporated in the central portion of the device. If the advance per unit rotation of the balancing feed screw is selected to be smaller than that of the driving feed screw the length of the cylinder can be accordingly reduced.

What is claimed is:

1. A balancing device, comprising:
   a driving electric motor;
   a feed screw turned by said motor;
   a balancing feed screw coupled to said feed screw; and
   a balancing cylinder coupled through thread means to said balancing feed screw, to apply torque to said balancing feed screw to reduce the load exerted on said motor.

2. A balancing device as claimed in claim 1, wherein said feed screw and said balancing feed screw are arranged coaxially with each other and are connected directly to one other.

3. A balancing device as claimed in claims 1 or 2, wherein said feed screw and said balancing feed screw are ball screws, and a lead of said balancing feed screw is shorter than that of said feed screw.

4. A balancing device as claimed in claim 1, said cylinder being fluid pressure operated cylinder and being connected to a control pressure source.

5. A balancing device as claimed in claim 4, wherein a torque is constantly applied to said feed screw by a load connected thereto, said load being balanced by a torque applied to said balancing feed screw by said cylinder.

6. A balancing device as claimed in claim 5, wherein said pressure applied to said cylinder is of a magnitude at least sufficient to generate a balancing torque sufficient to balance said load.

7. A balancing device as claimed in claim 4, said feed screw being subject to additional variable external loads, and means for compensating said additional loads comprising means for increasing and decreasing the pressure applied to said cylinder.

8. A balancing device as claimed in claim 7, wherein load detecting means are provided for controlling said pressure increasing and decreasing means; said motor comprising a part of said load detecting means.

9. A balancing device as claimed in claim 7, said pressure increasing and decreasing means comprising manually operated means for increasing or decreasing said pressure and means for disconnecting said motor from said feed screw, said manually operated means being used when said motor is so disconnected.

10. A balancing device as claimed in claims 1 or 2, wherein said balancing feed screw is substantially shorter than said feed screw.

11. A balancing device, comprising:
    a driving motor;
    a screw driven by said motor and subject to a torque generated by a load threadedly connected to said screw, said torque representing a load on said motor;
    compensating means connected to said screw, said compensating means developing a balancing torque relieving said load on said motor.

12. A balancing device as claimed in claim 11, said compensating means including means for converting a pressure to a mechanical torque.

13. A balancing device as claimed in claims 11 or 12, said compensating means comprising fluid pressure driven piston means, and second screw means, said second screw means being threadedly drivingly connected with said piston.

14. A balancing device as claimed in claim 13, further comprising means for varying the pressure exerted on said piston in response to the magnitude of said load.

* * * * *